US 11,213,160 B2

(12) United States Patent
Tsigounis

(10) Patent No.: US 11,213,160 B2
(45) Date of Patent: Jan. 4, 2022

(54) BEVERAGE PREPARATION APPARATUS

(71) Applicant: Mark Tsigounis, Truckee, CA (US)

(72) Inventor: Mark Tsigounis, Truckee, CA (US)

( * ) Notice: Subject to any disclaimer, the term of this patent is extended or adjusted under 35 U.S.C. 154(b) by 317 days.

(21) Appl. No.: 16/239,482

(22) Filed: Jan. 3, 2019

(65) Prior Publication Data
US 2019/0208949 A1 Jul. 11, 2019

Related U.S. Application Data

(60) Provisional application No. 62/614,664, filed on Jan. 8, 2018.

(51) Int. Cl.
| *A47J 31/02* | (2006.01) |
| *A47J 31/06* | (2006.01) |
| *A47J 31/44* | (2006.01) |
| *A47J 31/00* | (2006.01) |

(52) U.S. Cl.
CPC ......... *A47J 31/0626* (2013.01); *A47J 31/005* (2013.01); *A47J 31/02* (2013.01); *A47J 31/0636* (2013.01); *A47J 31/441* (2013.01); *A47J 31/446* (2013.01); *A47J 31/4407* (2013.01)

(58) Field of Classification Search
CPC ...... A47J 31/005; A47J 31/02; A47J 31/0626; A47J 31/0636; A47J 31/4407; A47J 31/441; A47J 31/446
USPC ................... 99/279–283, 288–291, 298–304
See application file for complete search history.

(56) References Cited

U.S. PATENT DOCUMENTS

| 237,352 | A | * | 2/1881 | Welch et al. | ........... A47J 31/06 |
| 414,596 | A | * | 11/1889 | Shobe | ........... A47J 31/06 |
| 495,937 | A | * | 4/1893 | Green | ........... A47J 31/06 |
| 503,342 | A | * | 8/1893 | Carlin | ........... A47J 31/54 |
| 600,818 | A | * | 3/1898 | West | ........... A47J 31/02 |
| 603,700 | A | * | 5/1898 | Mitchell | ........... A47J 31/4403 |
| 722,213 | A | * | 3/1903 | De Hart | ........... A47J 31/02 |
| 772,481 | A | * | 10/1904 | Talbert | ........... A47J 31/02 |
| 878,374 | A | * | 2/1908 | Geissler | ........... A47J 31/02 |
| 1,012,680 | A | * | 12/1911 | Mayer | ........... A47J 31/02 99/322 |
| 1,125,812 | A | * | 1/1915 | Camino | ........... A47J 31/06 99/298 |
| 1,347,142 | A | * | 7/1920 | Biette | ........... A47J 31/02 99/284 |
| 1,351,410 | A | * | 8/1920 | Bruning | ........... A47J 31/06 99/298 |
| 1,389,299 | A | * | 8/1921 | Gardiner | ........... A47J 31/0621 99/298 |
| 1,681,656 | A | * | 8/1928 | Biette | ........... A47J 31/02 99/306 |

(Continued)

FOREIGN PATENT DOCUMENTS

WO WO-2013105818 A1 * 7/2013 ............. A47J 31/06

*Primary Examiner* — Joshua E Rodden
(74) *Attorney, Agent, or Firm* — Foster Dobry

(57) ABSTRACT

A beverage preparation apparatus including a platform section having a plurality of attachment points for additional components. The platform is adapted to releasably secure in a wide variety of target beverage vessels. The additional components include, but are not limited to, a large volume filter means, a temperature regulator, or a gravity-fed brewer. The platform may also be incorporated into a vacuum-insulated, stainless-steel beverage vessel.

16 Claims, 9 Drawing Sheets

(56) References Cited

U.S. PATENT DOCUMENTS

| | | | | |
|---|---|---|---|---|
| 1,887,354 | A * | 11/1932 | Kapner | A47J 31/02 99/306 |
| 2,835,188 | A * | 5/1958 | Graham | A47J 31/0615 99/299 |
| 2,936,696 | A * | 5/1960 | Sorlini | A47J 31/303 99/303 |
| 3,047,175 | A | 7/1962 | Bramming | |
| 3,695,168 | A * | 10/1972 | Van Brunt | A47J 31/02 99/306 |
| 4,027,582 | A * | 6/1977 | O'Connell | A47J 31/02 99/306 |
| 4,069,751 | A * | 1/1978 | Gronwick | A47J 31/02 99/306 |
| 4,520,716 | A * | 6/1985 | Hayes | A47J 31/02 99/295 |
| 5,411,661 | A * | 5/1995 | Heiligman | A47J 31/605 210/264 |
| 5,947,004 | A * | 9/1999 | Huang | A47J 31/02 99/299 |
| 6,569,329 | B1 * | 5/2003 | Nohren, Jr. | B01D 29/15 210/282 |
| 6,913,165 | B2 | 7/2005 | Linz et al. | |
| 7,571,830 | B2 | 8/2009 | Lin | |
| 8,490,822 | B1 | 7/2013 | Griffin | |
| 8,757,049 | B2 * | 6/2014 | Giessler | A47J 31/0615 99/306 |
| 9,687,105 | B2 | 6/2017 | Johnson | |
| 10,051,987 | B2 * | 8/2018 | Bebo | A47J 31/06 |
| 2008/0099493 | A1 | 5/2008 | Grant | |
| 2009/0056557 | A1 * | 3/2009 | Lin | A47J 31/02 99/323 |
| 2010/0263549 | A1 * | 10/2010 | Lee | A47J 31/18 99/319 |
| 2012/0017766 | A1 * | 1/2012 | Anson | B01F 1/0027 99/290 |
| 2012/0055862 | A1 * | 3/2012 | Parekh | C02F 1/283 210/244 |
| 2012/0187036 | A1 * | 7/2012 | Risheq | C02F 1/003 210/282 |
| 2012/0216682 | A1 * | 8/2012 | Bodum | A47J 31/20 99/297 |
| 2012/0312173 | A1 * | 12/2012 | Geissler | A47J 31/02 99/290 |
| 2013/0032564 | A1 | 2/2013 | Rosbach | |
| 2014/0174965 | A1 * | 6/2014 | Herling | A47J 31/20 206/216 |
| 2018/0140127 | A1 * | 5/2018 | Lin | A47J 31/18 |

* cited by examiner

BEVERAGE PREPARATION APPARATUS

CROSS-REFERENCE TO RELATED APPLICATIONS

The present application claims the benefit of Provisional Patent Application No. 62/614,664, filed on Jan. 8, 2018, the content of this application is hereby incorporated by reference in its entirety.

FIELD OF THE INVENTION

The present invention relates generally to beverage preparation devices, and more specifically to multifunction platform beverage preparation devices.

BACKGROUND OF THE RELATED ART

There has long been a need for a compact brewing device which could perform several different brewing methods and adapt to a wide range of differently sized target beverage vessels. The related art attempted to provide such an apparatus, however, each of the related art were deficient, resulting in unsatisfactory devices. Deficiencies resulted because the related art taught single-function apparatus that are locked to the top opening of a beverage vessel.

The first related art is U.S. Pat. No. 9,687,105 to Johnson which discloses a portable, vacuum-insulated gravity-fed brewing device. The device has a large capacity and is capable of brewing tea or coffee at both high and low temperatures. The gravity-fed brewer is releasably secured at the top opening of the vacuum-insulated flask.

The second related art is U.S. Patent Application Publication Number 2009/0056557 to Lin, which discloses a brewing vessel and travel mug. The device comprises a filter basket releasably attached to the top opening of the outside surface of a travel flask, the filter basket having a top cover and being capable of receiving a brewing substrate.

The last related art is U.S. Patent Application Publication Number 2010/0263549 to Lee, which discloses a beverage container having an infusion element disposed within the top opening of the container, the infusion element being raised or lowered with an actuator body. This invention allows the user to infuse a liquid with a target substrate in the infusion element, raising said infusion element once brewing is completed.

The prior art consists essentially of a single-function, top-opening-mounted brewing means attached to an insulated container. Several deficiencies resulted from these designs. First, the brewing means must be adapted to a specific container in order to work, limiting flexibility of the device. Second, the brewing means must be adapted to the top opening of the container, and—given the shape of common tapered-cylindrical beverage vessels—will not work at a point lower than the top opening. Finally, the user may only employ one brewing means with the related art devices, limiting potential brewing methods.

The related art also, generally, teaches a brewing means attached to the vessel itself, not to an intermediary apparatus. This arrangement limits the size of the brewing attachments, as they must also accommodate the beverage vessel. Therefore, none of the related art devices may be adapted to fit several differently-sized beverage vessels without also having several differently-sized brewing attachments.

SUMMARY OF THE INVENTION

The present embodiment, generally, comprises a stand-alone platform apparatus for preparing beverages, such as coffee or tea, in any vessel or container. The apparatus utilizes a platform capable of releasably attaching a variety of additional components, including, for example, a gravity-fed brewer, a temperature regulator, and a large volume filter means. Other additional components may be utilized in order to fulfill the desired brewing mechanism.

In the preferred embodiment, the platform comprises a circular silicone rubber section, which is capable of releasable attachment to a beverage vessel. The design of the platform permits it to fit into nearly any beverage vessel, as the platform may attach to the side or top of a beverage vessel depending upon the vessel's width. When attaching to the side of a vessel, the platform is secured by friction to the vessel side.

The platform incorporates two filtering means, one in the form of orifices in communication with the first surface and the second surface of the platform, and another in the form of a micro-holed filter enclosing the inner diameter of the platform. The orifices permit the ingress or egress of liquids while straining larger solids, such as ice. The micro-hole filter permits straining of much finer material—such as coffee grounds or tea leaves—when the platform is connected to an additional component.

In the preferred embodiment, the platform attaches the additional components at one of three points, a first surface attachment point, a second surface attachment point, or a tertiary attachment point. These three attachment points permit the user to attach from zero to three additional components. For example, the user may attach all three additional components at the same time to contemporaneously brew different substrates.

Additional components include, but are not limited to, a temperature regulator, a large volume filter means, or a gravity-fed brewer. The temperature regulator attaches to the platform and serves to either raise or lower the temperature of a liquid contained therein. In the preferred embodiment of the temperature regulator, temperature adjustment is accomplished by heating or cooling the temperature regulator itself. In another embodiment, the temperature regulator may adjust the temperature with a self-contained heating or cooling element.

The second additional component is the large volume filter means, which attaches to the platform and serves to brew a large quantity of substrate, while straining small to large particulate matter from a liquid. In the preferred embodiment, the large volume filter means is constructed from stainless steel perforated with micro-holes.

Finally, the gravity-fed brewer enables the user to perform a pour-over brew method. In this embodiment, the gravity-fed brewer acts in concert with the platform's micro-holed filter to expose a substrate to the target liquid for a desired amount of time, while simultaneously filtering the substrate from the liquid. Also incorporated into the preferred embodiment of the gravity-fed brewer are a set of protrusions. The protrusions act to raise a filter from the main surface of the gravity-fed brewer, limiting contact between the filter and the gravity-fed brewer body, thereby limiting adhesion.

The above-mentioned components may be used alone or in concert with other additional components. Also, further additional components may be conceived of—and utilized with—the platform.

In another embodiment, the platform is incorporated, along with the additional components, into a double-walled, stainless-steel vessel. The gravity-fed brewer may also serve an additional function in this embodiment—as a top to the beverage vessel. In order to serve as a top, the gravity-fed brewer incorporates a removable lid.

A key benefit of the platform embodiment is that it enables a user to incorporate the platform into nearly any beverage vessel. A user can purchase several different sizes of platforms, placing an appropriately sized platform into their beverage vessel. The platforms have a standard attachment point size, so that a user need only purchase one set of additional components. The user may simply select the appropriate size of platform and secures the desired additional components—several sizes of additional components are not needed.

DETAILED DESCRIPTION OF THE PREFERRED EMBODIMENTS

Figure 1:
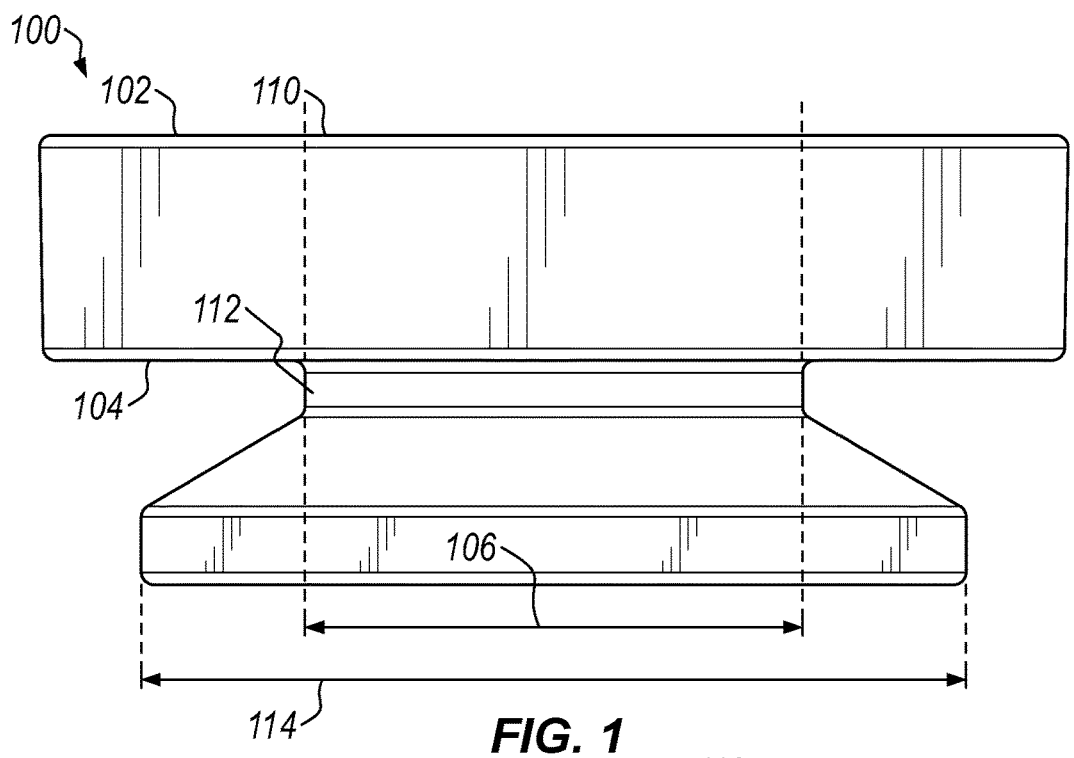
FIG. 1 is a side view of the platform device.

Turning now to FIG. 1, which shows the platform 100. In the preferred embodiment, the platform 100 is circular and constructed of silicone rubber. The platform 100 has a first surface 102 and a second surface 104. The platform 100 has an inner diameter 106, said inner diameter 106 defining a space therein. The inner diameter 106 permits the ingress or egress of liquid.

In the preferred embodiment, the inner diameter 106 further comprises a first surface attachment point 110 and a second surface attachment point 112. In this embodiment, the platform's 100 inner diameter 106 is identical for both the first surface attachment point 110 and the second surface attachment point 112. Additionally, a tertiary attachment point 114 resides beneath the second surface attachment point 112. The first surface attachment point 110, the second surface attachment point 112, and the tertiary attachment point 114 support a plurality of additional components.

Figure 2A:
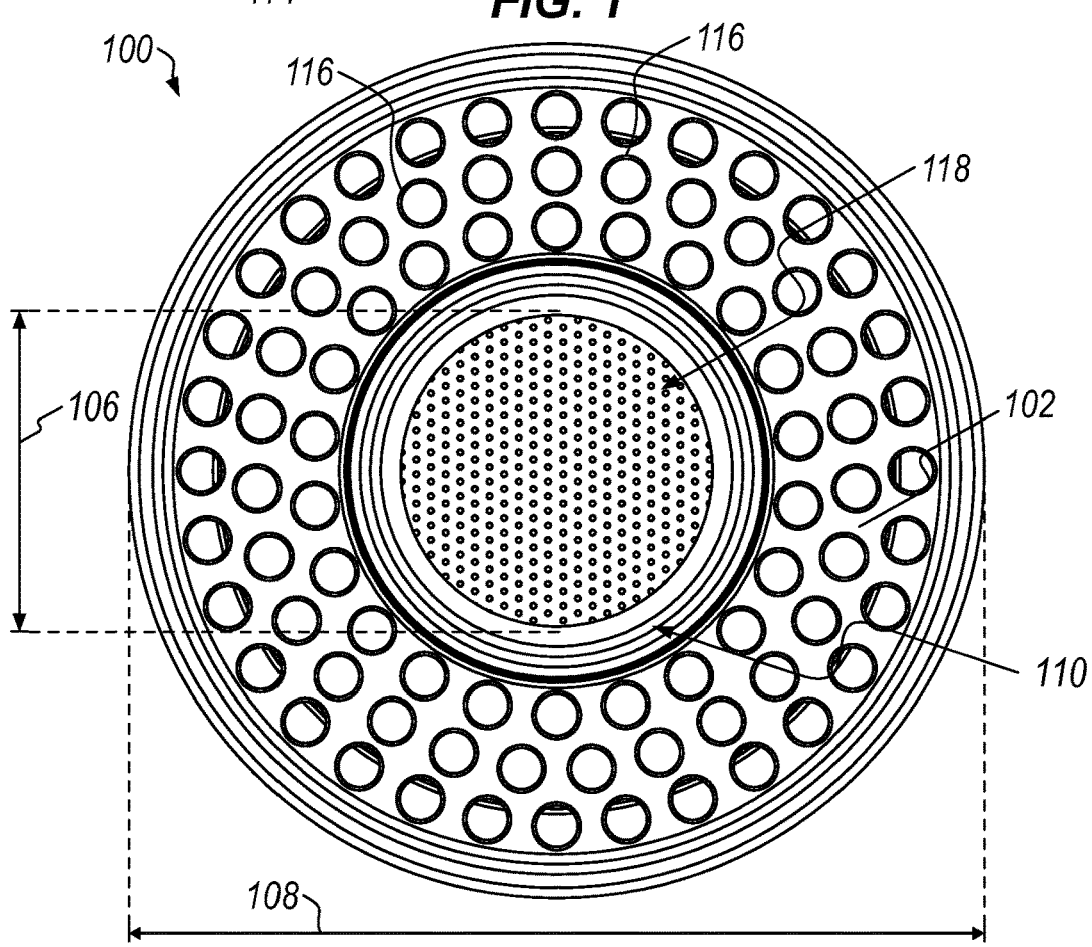
FIG. 2a is a top view of the platform device.

FIG. 2a shows a top view of the first surface 102 of the platform 100. In the preferred embodiment the inner diameter 106 is enclosed with a filter means 118. The filter means 118 has micro-holes, which are defined as holes of between 150 and 250 micrometers. The filter means 118 may be constructed from stainless steel, ceramic, or any other suitable material. The inner diameter's 106 first surface attachment point 110 is also shown. The first surface attachment point 110 may be utilized to attach additional components or remain unattached to permit closing of the beverage vessel.

Figure 2B:
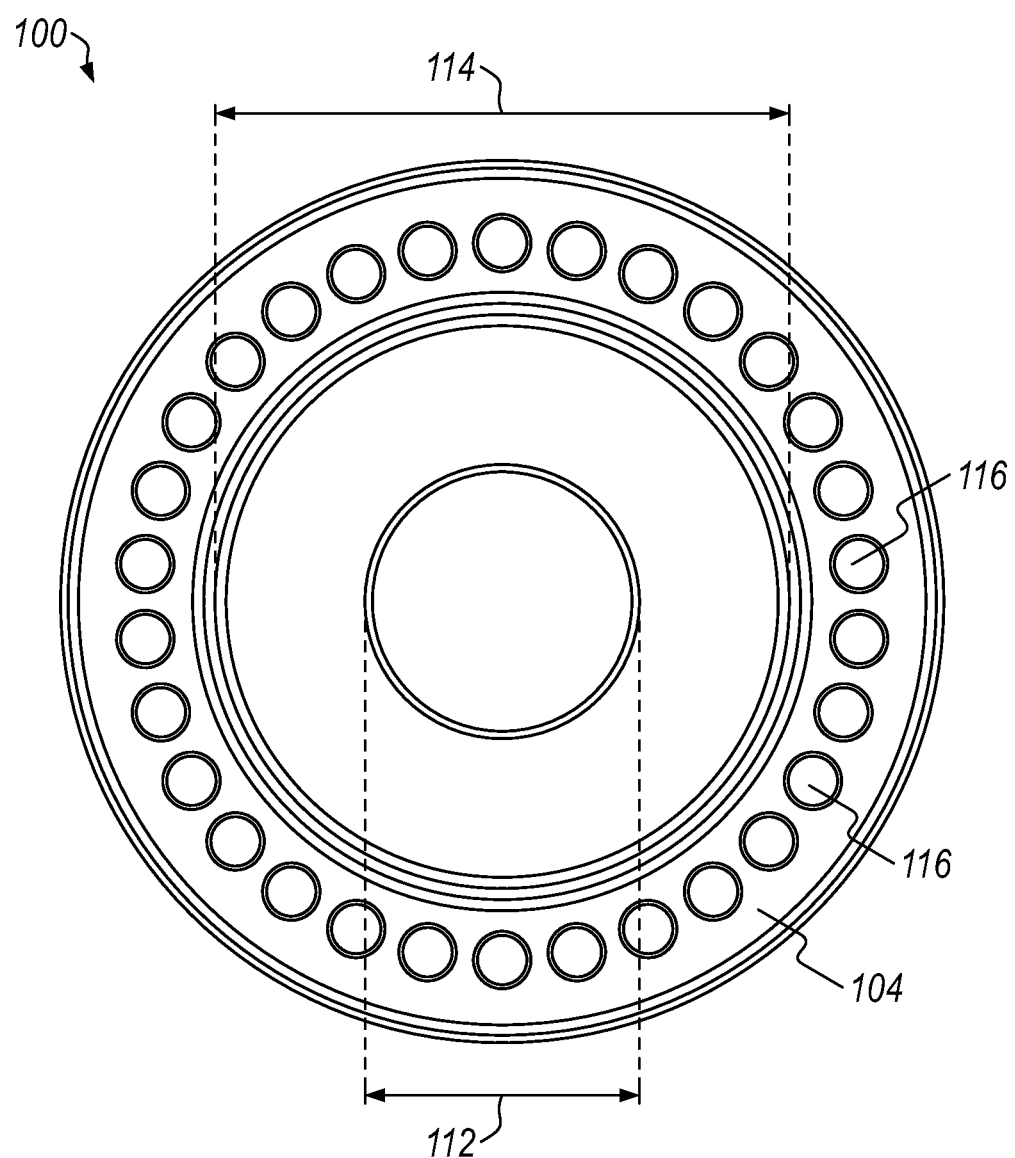
FIG. 2b is a bottom view of the platform device.

FIGS. 2a and 2b also show the platform orifices 116 which are in communication with the first surface 102 and the second surface 104 of the platform 100. A plurality of platform orifices 116 are interposed between the inner diameter 106 and the outer diameter 108. The platform orifices 116 permit the ingress or egress of liquids, while straining larger solids. In the preferred embodiment, the platform orifices 116 are one-quarter of an inch in diameter.

FIG. 2b also shows a view of the second surface 104 of the platform 100. Shown from the second surface 104 view are the second surface attachment point 112 and the tertiary attachment point 114. In the preferred embodiment, the tertiary attachment point's 114 width is 1.63 times the width of the first surface attachment point 110 and the second surface attachment point 112. This size differential permits attachment of an additional component at both the second surface attachment point 112 and the tertiary attachment point 114. A user can, therefore, attach multiple additional components, enabling complex brewing methods.

The first surface attachment point 110, second surface attachment point 112, and tertiary attachment point 114 secure additional components through a friction clip mechanism, wherein the attachment points are constructed from a material designed to maximize friction between the attachment point and an additional component, and sized slightly larger than the additional component attachment point. In the preferred embodiment, the attachment points are constructed from silicone rubber and are sized 0.2 millimeters greater than the additional component's attachment point.

Figure 3:
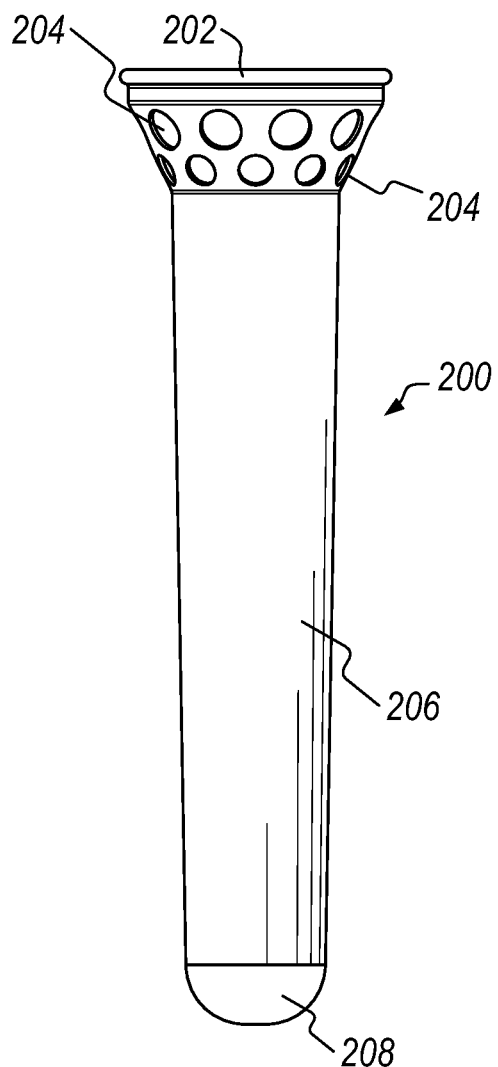
FIG. 3 is a side view of the temperature regulator.
Figure 4:
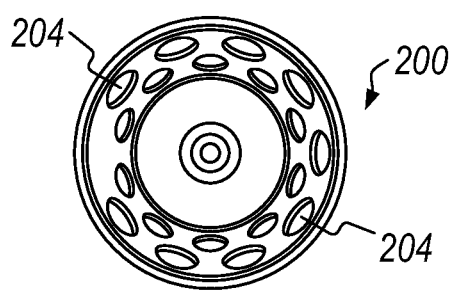
FIG. 4 is a top view of the temperature regulator.

FIGS. 3 and 4 show the first additional component: the temperature regulator 200. In the preferred embodiment the temperature regulator 200 comprises a temperature regulator attachment point 202 connected to a temperature regulator base 208 via a temperature regulator body 206. Also shown are the temperature regulator orifices 204. The temperature regulator orifices 204 permit the egress or ingress of liquids while the temperature regulator 200 is connected to the platform.

The temperature regulator 200 serves to either raise or lower the temperature of the surrounding liquid depending upon the user's preference. The raising or lowering of the temperature by the temperature regulator 200 is accomplished by either heating or cooling the temperature regulator 200 prior to insertion of the temperature regulator 200 into the target liquid. In another embodiment, the temperature regulator 200 accomplishes heating or cooling of the target liquid via a self-contained heating or cooling element.

Figure 5:
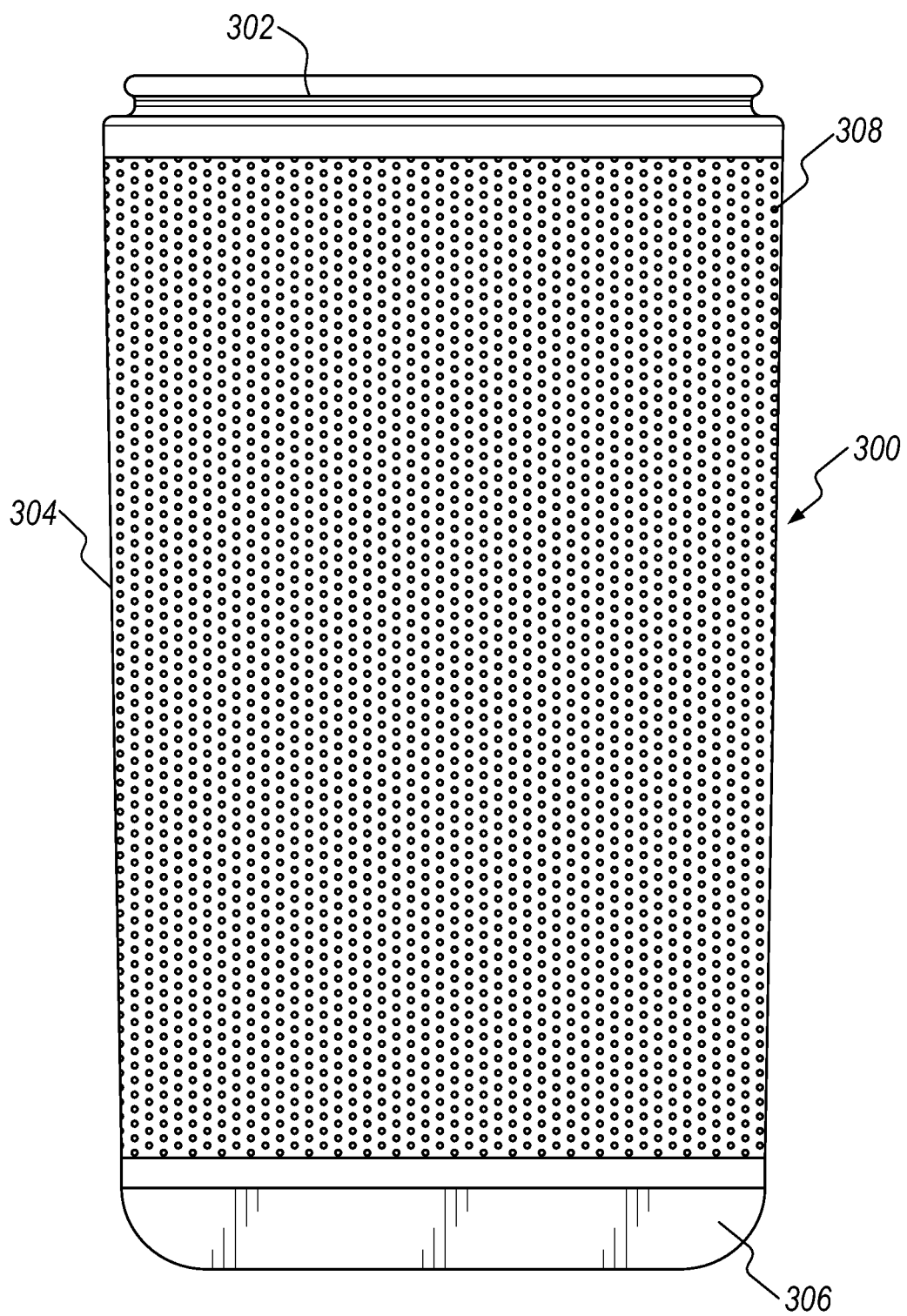
FIG. 5 is a side view of the large volume filter means.
Figure 6:
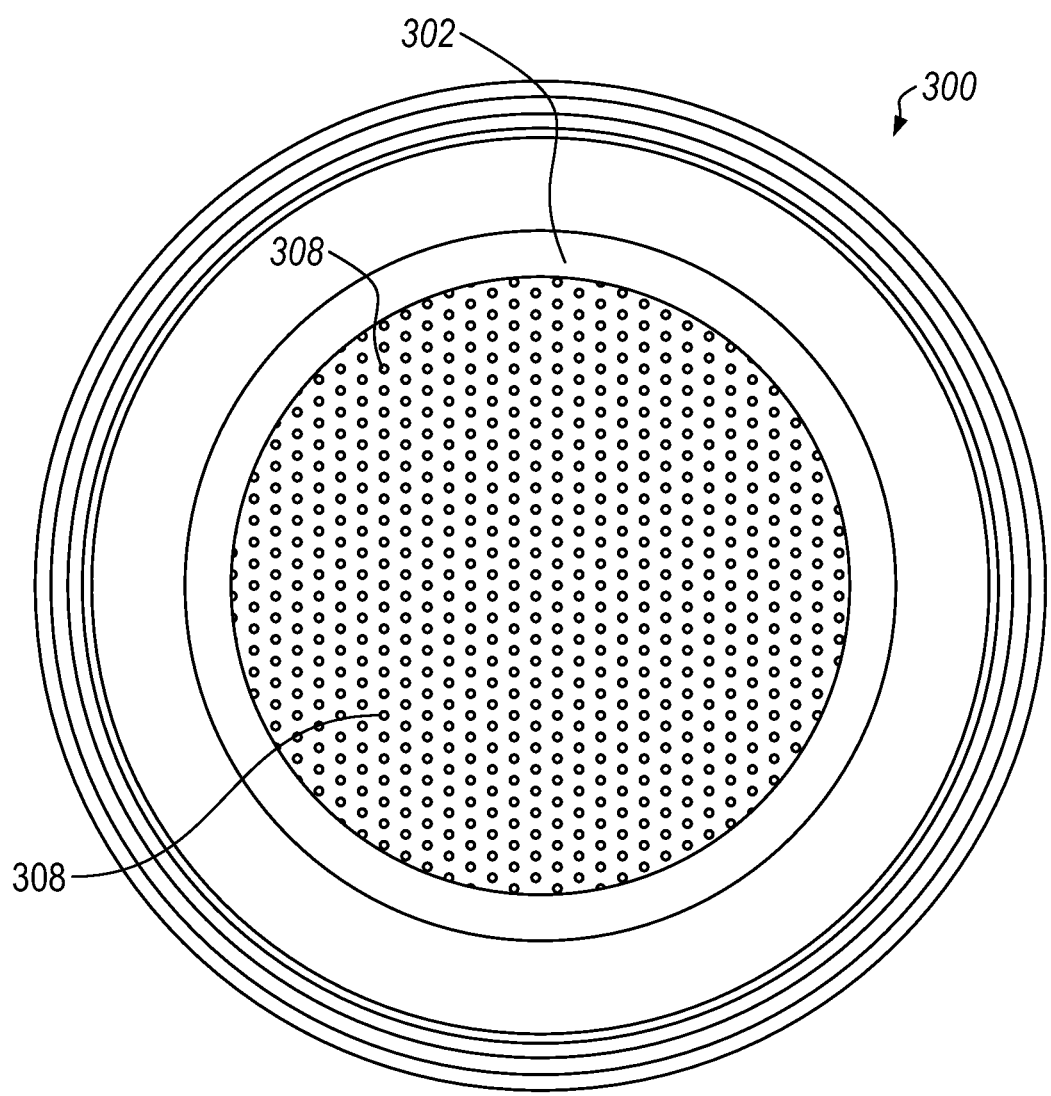
FIG. 6 is a top view of the large volume filter means.

FIGS. 5 and 6 show the second additional component: the large volume filter means 300. The large volume filter means 300 comprises the large volume filter means attachment point 302 connected to the large volume filter means base 306 via the large volume filter means body 304. In the preferred embodiment, the large volume filter means body 304 and the large volume filter means base 306 are constructed from stainless steel perforated with micro-holes 308. The micro-holes 308 permit the filtering of particulate matter from the target liquid. In another embodiment, the large volume filter means 300 may comprise a plastic frame overlaid with a plastic, metal, or paper filter means.

Figure 7:
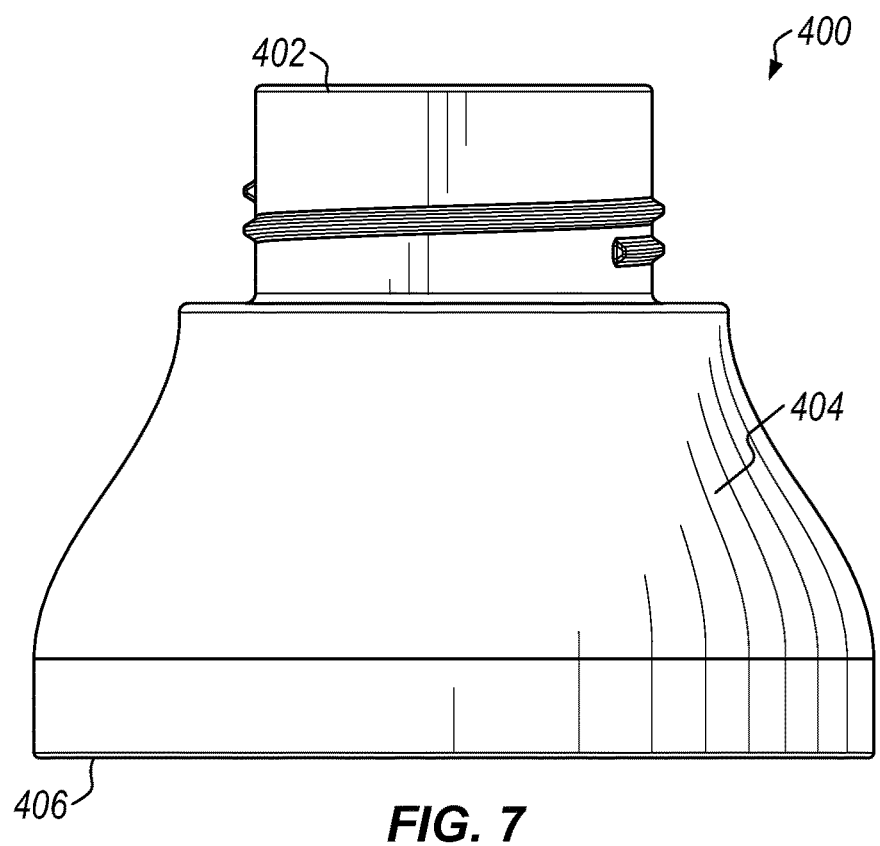
FIG. 7 is a side view of the gravity-fed brewer.
Figure 8:
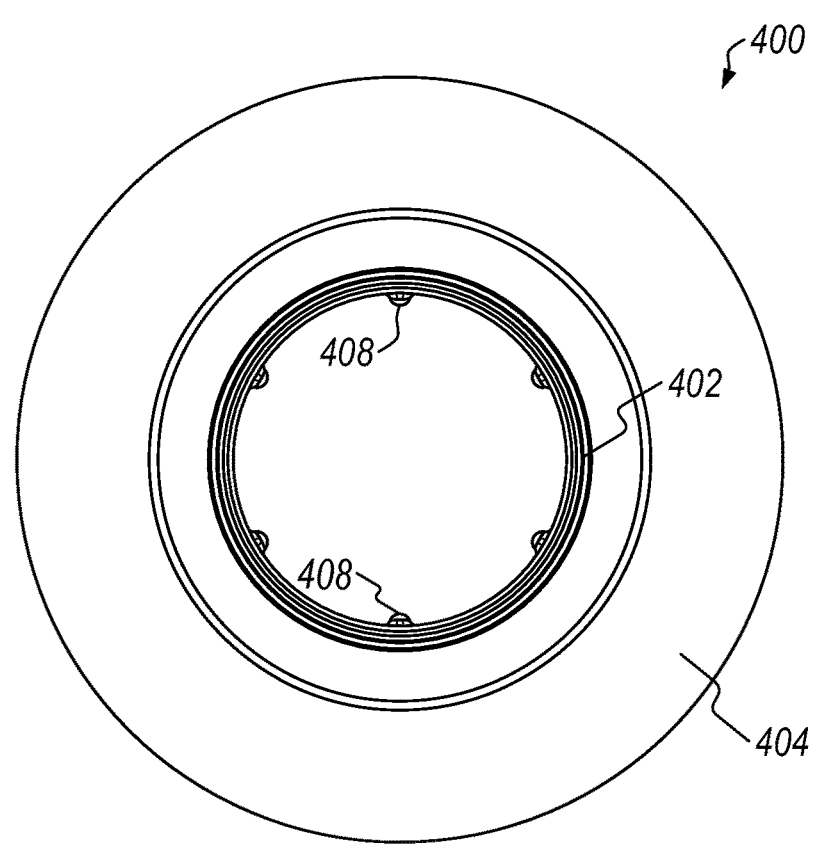
FIG. 8 is a top view of the gravity-fed brewer.

FIGS. 7 and 8 show another additional component: the gravity-fed brewer 400. The gravity-fed brewer 400 comprises the gravity-fed brewer attachment point 402 connected to the gravity-fed brewer opening 406 via the gravity-fed brewer body 404. In the preferred embodiment, the gravity-fed brewer 400 is conically shaped and includes protrusions 408 which limit filter adhesion to the gravity-fed brewer body 404.

Figure 9A:
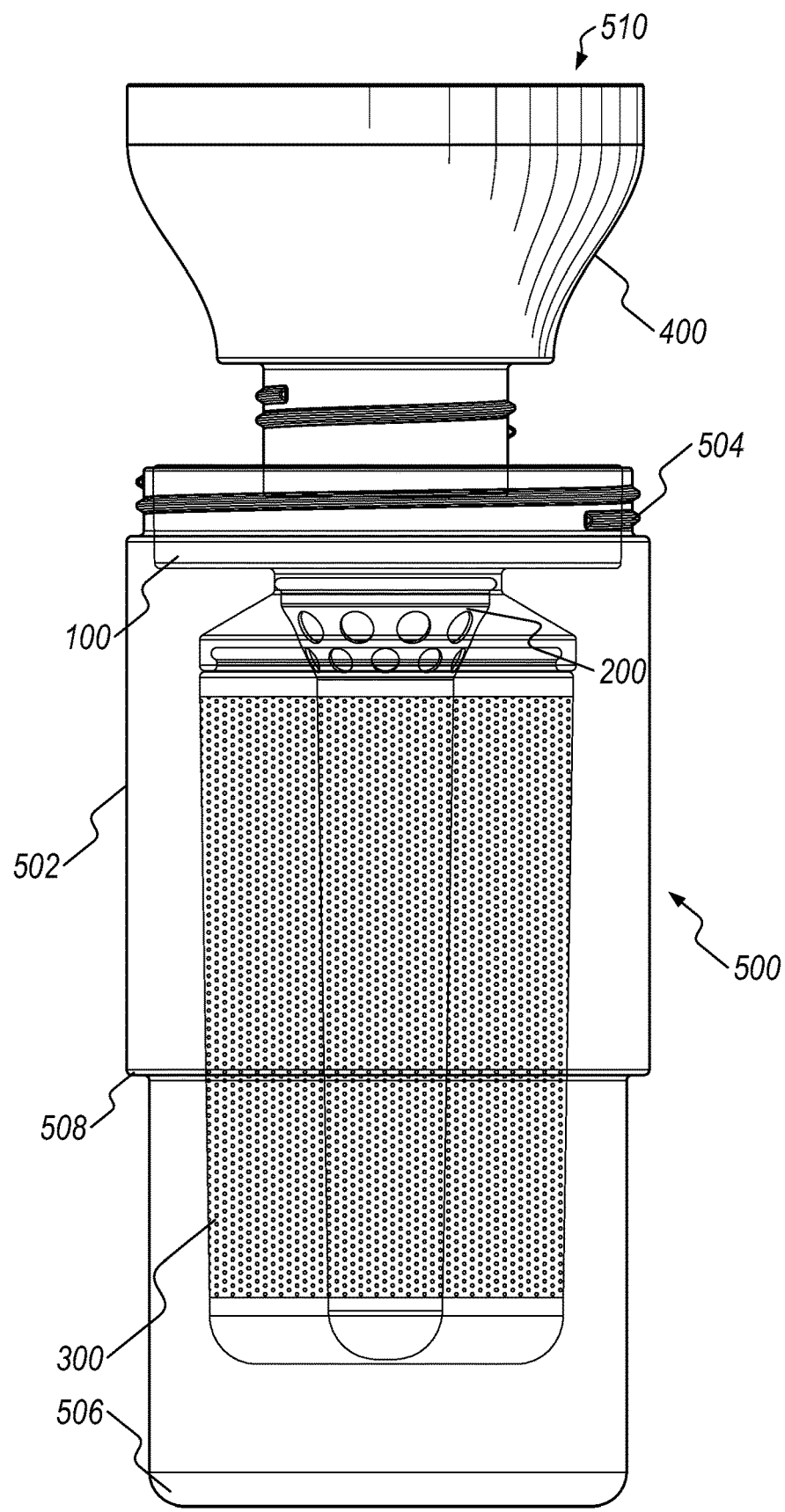
FIG. 9a is a side view of an embodiment of the current invention.
Figure 9B:
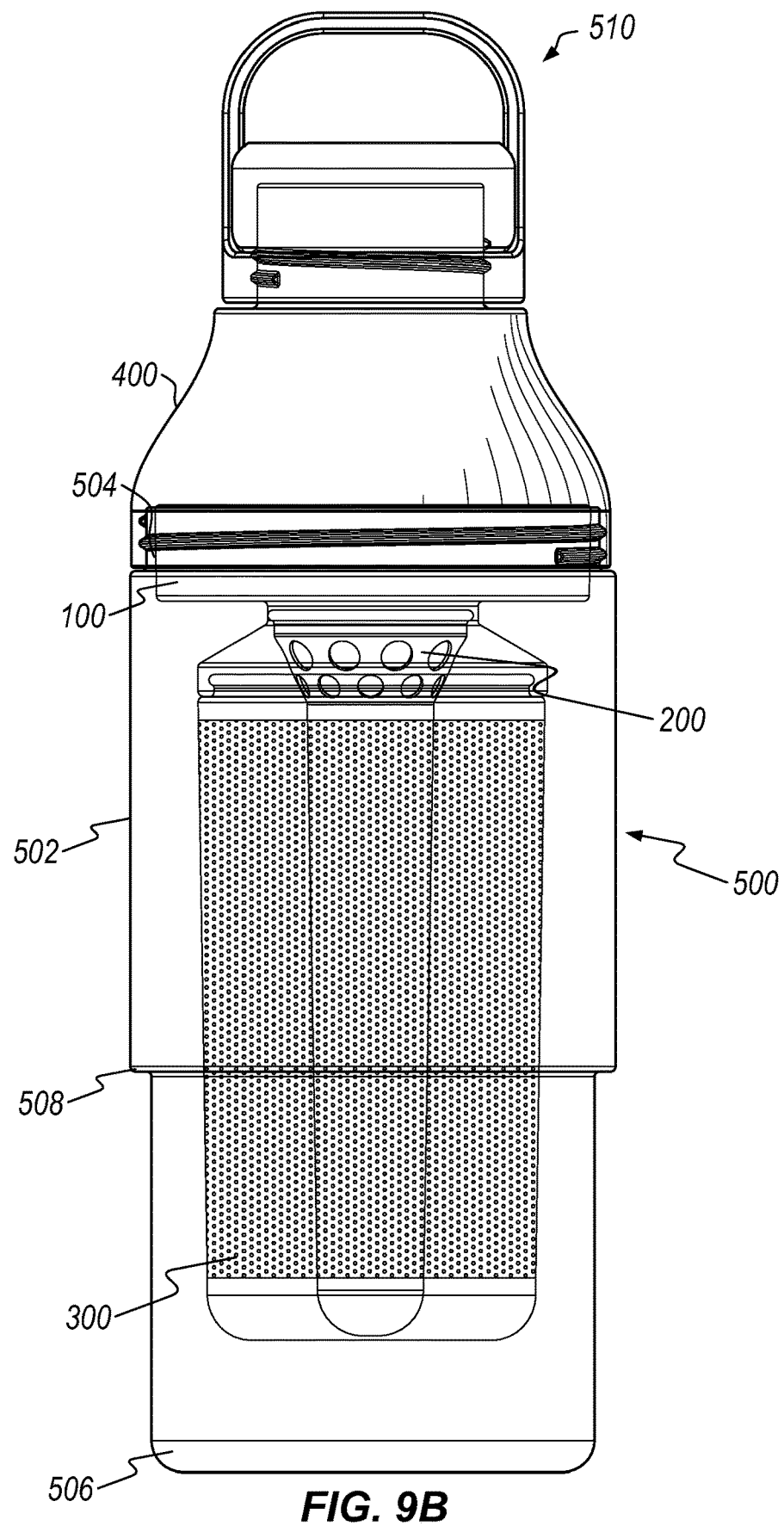
FIG. 9b is a side view of an alternative embodiment of the current invention incorporating a vessel lid.

Turning now to FIGS. 9a and 9b, which show the preferred embodiment of the current invention. In this embodiment, a vessel 500 supports the platform 100 near the vessel opening 504. The vessel 500 may be constructed from any suitable material, including but not limited to: stainless steel or other metal, plastic, glass, or ceramic. In the preferred embodiment the vessel 500 is a double-walled, stainless-steel flask.

FIGS. 9a and 9b also show the adaptability of the platform 100 to accommodate multiple additional components at one time. The user may attach up to three additional components facilitating complex brewing processes. The additional components are also nested, limiting the amount of space they occupy. A user can take one device to fulfill all brewing needs, rather than needing to bring several different devices.

FIG. 9b also shows an alternative embodiment of the gravity-fed brewer 400, in which the gravity-fed brewer may serve as both a brewing component and a removable top. In this embodiment, the gravity-fed brewer 400 releasably attaches to a vessel lid 510 and the vessel opening 504. The gravity-fed brewer 400 attaches to the vessel lid 510 via a screw cap closure, which may incorporate a leash mechanism, the leash securing the vessel lid 510 when the vessel lid 510 is not attached to the gravity-fed brewer 400.

Figure 10:
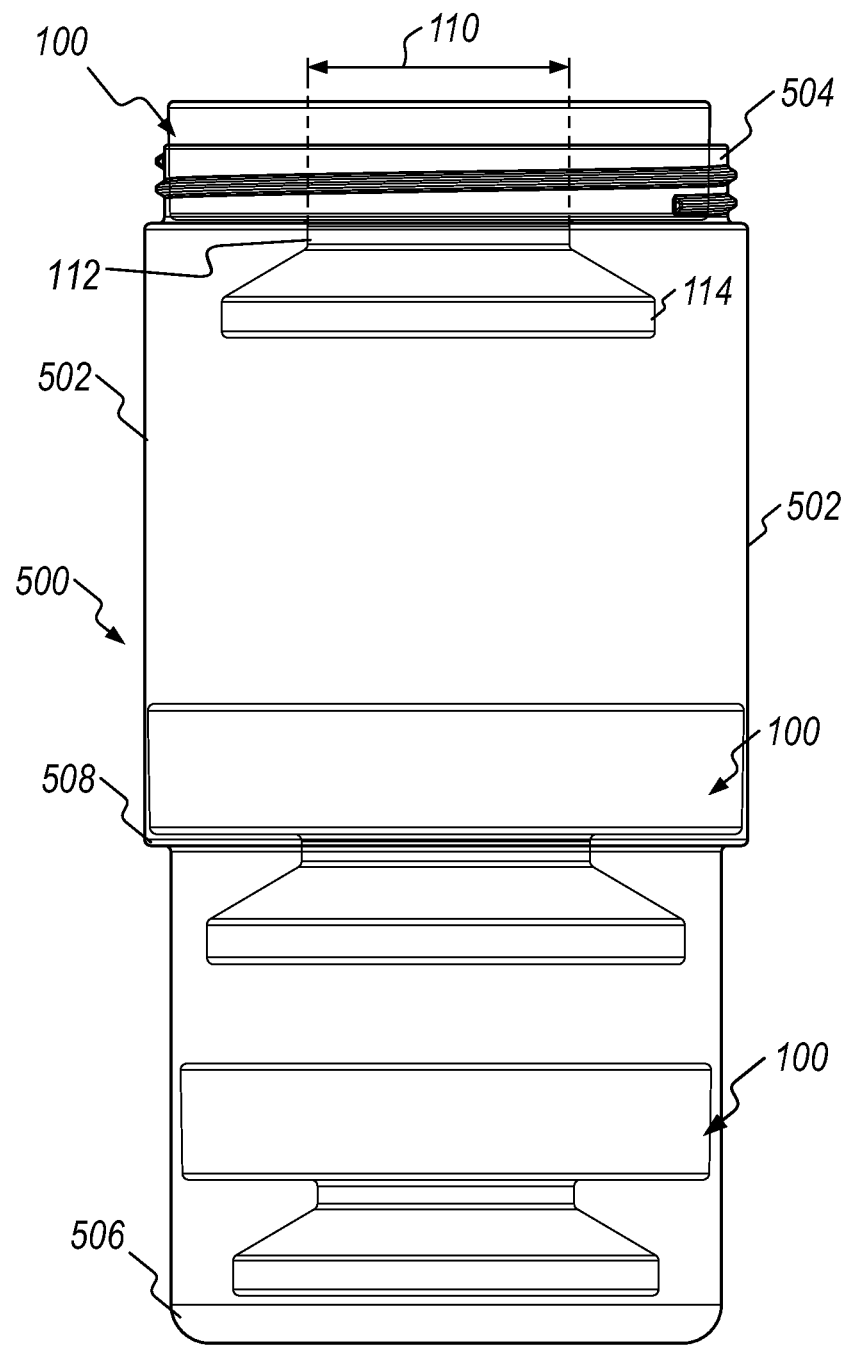
FIG. 10 is a side view of an alternative embodiment of the current invention.

FIG. 10 shows the platform 100 attached to the vessel 500 at various positions. In the first position, the platform 100 is attached at the vessel opening 504. In this position, a plurality of additional components may be attached at the first surface attachment point 110, second surface attachment point 112, or the tertiary attachment point 114. In the second position, the platform 100 is attached at the vessel middle 508. In this position, a plurality of additional components may also be attached at the first surface attachment point 110, second surface attachment point 112, or the tertiary attachment point 114. In the third position, the platform 100 is attached at the vessel bottom 506. In this position, a plurality of additional components may be attached at the first surface attachment point 110.

In another embodiment, the vessel 500 may support the platform 100 at any point along the vessel side 502. A suitable point for attaching the platform 100 depends upon the desired use. In an embodiment where the platform 100 resides lower than the vessel opening 504, the platform 100 is secured via friction with the vessel sides 502. This adaptability of the platform 100 allows it to accommodate nearly any commonly available beverage vessel 500.

Although several embodiments have been described for illustrative purposes, various modifications to the above-mentioned embodiments may be made without departing from the scope of the current invention. Thus, the scope is not limited except as by the appended claims.

I claim:

1. A beverage preparation apparatus comprising:
   a platform having a first surface and a second surface, the first surface and second surface including a plurality of orifices, the plurality of orifices in the first surface outnumber the plurality of orifices in the second surface,
   an inward-oriented inner diameter and an outer diameter, the inner diameter defining a space enclosed with a micro-hole filter means, the inner diameter also forming at least one first attachment point and at least one second surface attachment point, and
   a tertiary attachment point affixed to the second surface of the platform,
   wherein the first surface attachment point, the second surface attachment point, or the tertiary attachment point secure at least one additional component.

2. The apparatus of claim 1 wherein the additional component further comprises a temperature regulator.

3. The apparatus of claim 1 wherein the additional component further comprises a large volume filter means.

4. The apparatus of claim 1 wherein the additional component further comprises a gravity-fed brewer.

5. The apparatus of claim 4 wherein the gravity-fed brewer further comprises a removable lid closure means.

6. The apparatus of claim 1 wherein some of orifices are in communication with the first surface and the second surface of said platform and interposed between the outer diameter and the inner diameter of the platform.

7. A beverage preparation apparatus comprising:
   a platform having a first surface and a second surface, an inward-oriented inner diameter and an outer diameter, the first surface and second surface including a plurality of orifices, the plurality of orifices in the first surface outnumber the plurality of orifices in the second surface, and the plurality of orifices are interposed between the outer diameter and the inner diameter of the platform,
   the inner diameter defining a space enclosed with a micro-hole filter means, the inner diameter further comprising at least one first surface attachment point and at least one second surface attachment point, and
   a tertiary attachment point affixed to the second surface of the platform,
   wherein the first surface attachment point, the second surface attachment point, or the tertiary attachment point secure at least one additional component.

8. The apparatus of claim 7 wherein the additional component further comprises a temperature regulator.

9. The apparatus of claim 7 wherein the additional component further comprises a large volume filter means.

10. The apparatus of claim 7 wherein the additional component further comprises a gravity-fed brewer.

11. The apparatus of claim 10 wherein the gravity-fed brewer further comprises a removable lid closure means.

12. A beverage preparation apparatus comprising:
    a platform having a first surface and a second surface, an inward-oriented inner diameter and an outer diameter, the first surface and second surface including a plurality of orifices, the plurality of orifices in the first surface outnumber the plurality of orifices in the second surface, and the plurality of orifices are interposed between the outer diameter and the inner diameter of the platform,
    the inner diameter of the platform defining a space enclosed with a micro-hole filter means, the inner diameter also forming at least one first surface attachment point and at least one second surface attachment point, and
    a tertiary attachment point affixed to the second surface of the platform,
    wherein the first surface attachment point, the second surface attachment point, and the tertiary attachment point secure at least one additional component.

13. The apparatus of claim 12 wherein the additional component further comprises a temperature regulator.

14. The apparatus of claim 12 wherein the additional component further comprises a large volume filter means.

15. The apparatus of claim 12 wherein the additional component further comprises a gravity-fed brewer.

16. The apparatus of claim 15 wherein the gravity-fed brewer further comprises a removable lid closure means.

* * * * *